United States Patent [19]

Chen et al.

[11] Patent Number: 5,894,920
[45] Date of Patent: Apr. 20, 1999

[54] BRICK-LIKE ARTICLE FEEDING MECHANISM WITH NEARLY SQUARE TRAVEL PATH AND QUICK RETURNING FUNCTION

[75] Inventors: Chien-Ming Chen, Taipei Hsien; Do-Yu Lee, Hsinchu, both of Taiwan

[73] Assignee: Industrial Technology Research Institute, Hsinchu, Taiwan

[21] Appl. No.: 08/791,645

[22] Filed: Nov. 25, 1996

[51] Int. Cl.[6] .......................... B65G 25/00; B65G 25/02
[52] U.S. Cl. ........................ 198/740; 198/468.01
[58] Field of Search ........................ 198/468.01, 740

[56] References Cited

U.S. PATENT DOCUMENTS 1,455,014  5/1923  Anderson ............... 198/740 X
3,422,966  1/1969  Iansons .................. 198/343.1
4,450,950  5/1984  Foote, Jr. ............... 198/474.1

*Primary Examiner*—Karen M. Young
*Assistant Examiner*—Steven B. McAllister
*Attorney, Agent, or Firm*—Pro-Techtor International Services

[57] ABSTRACT

A brick-like article feeding mechanism with nearly square travel path and quick returning function includes an eccentric apparatus composed of a slide block and a slide channel and cooperative spur gear and internal gear with a gear ratio of 1:4. In cooperation with synchronously driving sprockets, the pushing arms for feeding the article travel through a nearly square path. One side of the square travel path (loading travel) costs a period of time equal to the sum of the time cost by the other three sides (unloading travel) so as to achieve a quick returning function and synchronous operation.

2 Claims, 5 Drawing Sheets

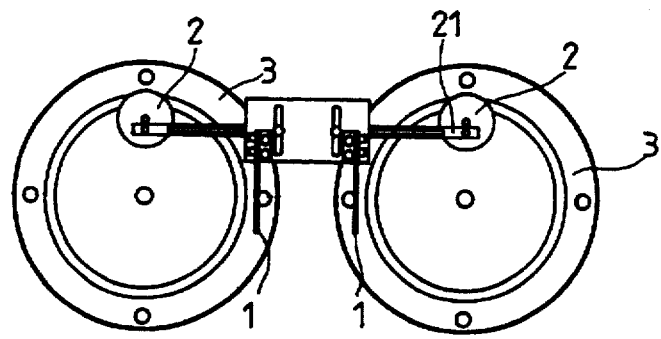
FIG.5-A
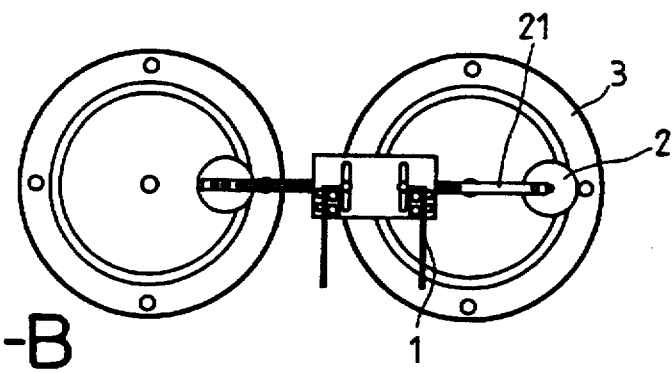
FIG.5-B
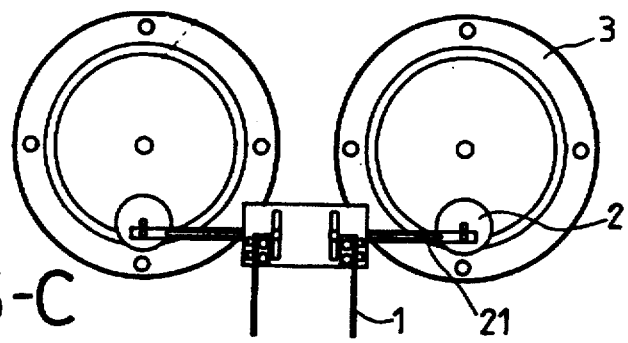
FIG.5-C
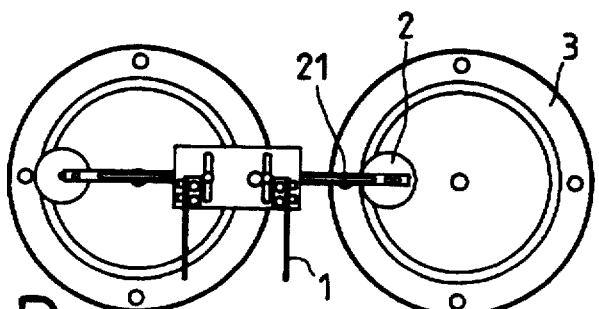
FIG.5-D

BRICK-LIKE ARTICLE FEEDING MECHANISM WITH NEARLY SQUARE TRAVEL PATH AND QUICK RETURNING FUNCTION

BACKGROUND OF THE INVENTION

The present invention relates to a brick-like article feeding mechanism with nearly square travel path and quick returning function, which is connected to a working apparatus such as a packing machine to perform synchronous and quick returning function.

With respect to an existing working apparatus such as a packing machine, the articles to be packed or processed must be first placed into the carrier by labor for the packing machine or other working apparatus to perform the next step. In order to reduce the cost for labor, speed up the production and increase the reliability, it is necessary to automatize the brick-like article feeding operation.

A variety of feeding devices are commercially available for performing different article feeding operation with respect to different products. Some of the feeding devices directly push the articles into the working apparatus via a conveyor without good synchronization with the working apparatus. Some other employ rollers and chains as well as pushing arms for pushing the articles. However, at the end of the pushing operation, the travel path of the pushing arms are arched. This makes the articles tend to fall down. In the case that the feeding operation is performed by a cylinder, the feeding frequency and speed will be limited.

SUMMARY OF THE INVENTION

It is therefore a primary object of the present invention to provide a brick-like article feeding mechanism with nearly square travel path and quick returning function, which is applicable to those working apparatuses necessitating synchronous article feeding operation. A conveyor is used to push the articles into the article feeding mechanism and then the pushing arms with nearly square travel path and quick returning function are vertically lowered and then horizontally moved to feed the articles to a fixed position. Thereafter the pushing arms are vertically lifted. By means of repeated operation, the article is continuously fed into the working apparatus. In an unloading state, the unloading travel time of the pushing arms is equal to the loading travel time so as to achieve a quick returning function and speed up the article feeding operation.

According to the above object, an assembly of a spur gear and an internal gear with a gear ratio of 1:4 is used. The spur gear is rotated around the internal gear. By means of analysis, a coupler point can be found on the spur gear, which point has a most nearly square travel path when rotating and revolving along with the spur gear around the internal gear. Therefore, it is possible by way of mechanical design to fix the pushing arm at this coupler point so as to feed the article through the nearly square travel path.

Theoretically, the time cost by each side of the nearly square travel path should be equal to another. However, on the basis of the design concept that the loading travel time is equal to the unloading travel time, an eccentric means composed of a slide block and a slide channel is disposed on the driving shaft, whereby the time cost by one side of the square travel path (loading travel) will equal to the sum of the time cost by the other three sides (unloading travel) so as to achieve a quick returning function and speed up the article feeding operation. By means of the cooperation between the gears and sprockets and chain, the article feeding mechanism can smoothly feed the articles into the carrier of the working apparatus in synchronization with the working apparatus.

The present invention can be best understood through the following description and accompanying drawing, wherein:

BRIEF DESCRIPTION OF THE DRAWINGS

FIG. 5-1 is a plane view showing that the pushing arms of the article feeding mechanism of the present invention are positioned on upper side of the nearly square travel path;

FIG. 5-2 is a plane view showing that the pushing arms of the article feeding mechanism of the present invention are positioned on right side of the nearly square travel path;

FIG. 5-3 is a plane view showing that the pushing arms of the article feeding mechanism of the present invention are positioned on lower side of the nearly square travel path; and FIG. 5-4 is a plane view showing that the pushing arms of the article feeding mechanism of the present invention are positioned on left side of the nearly square travel path.

DETAILED DESCRIPTION OF THE PREFERRED EMBODIMENT

Figure 1:
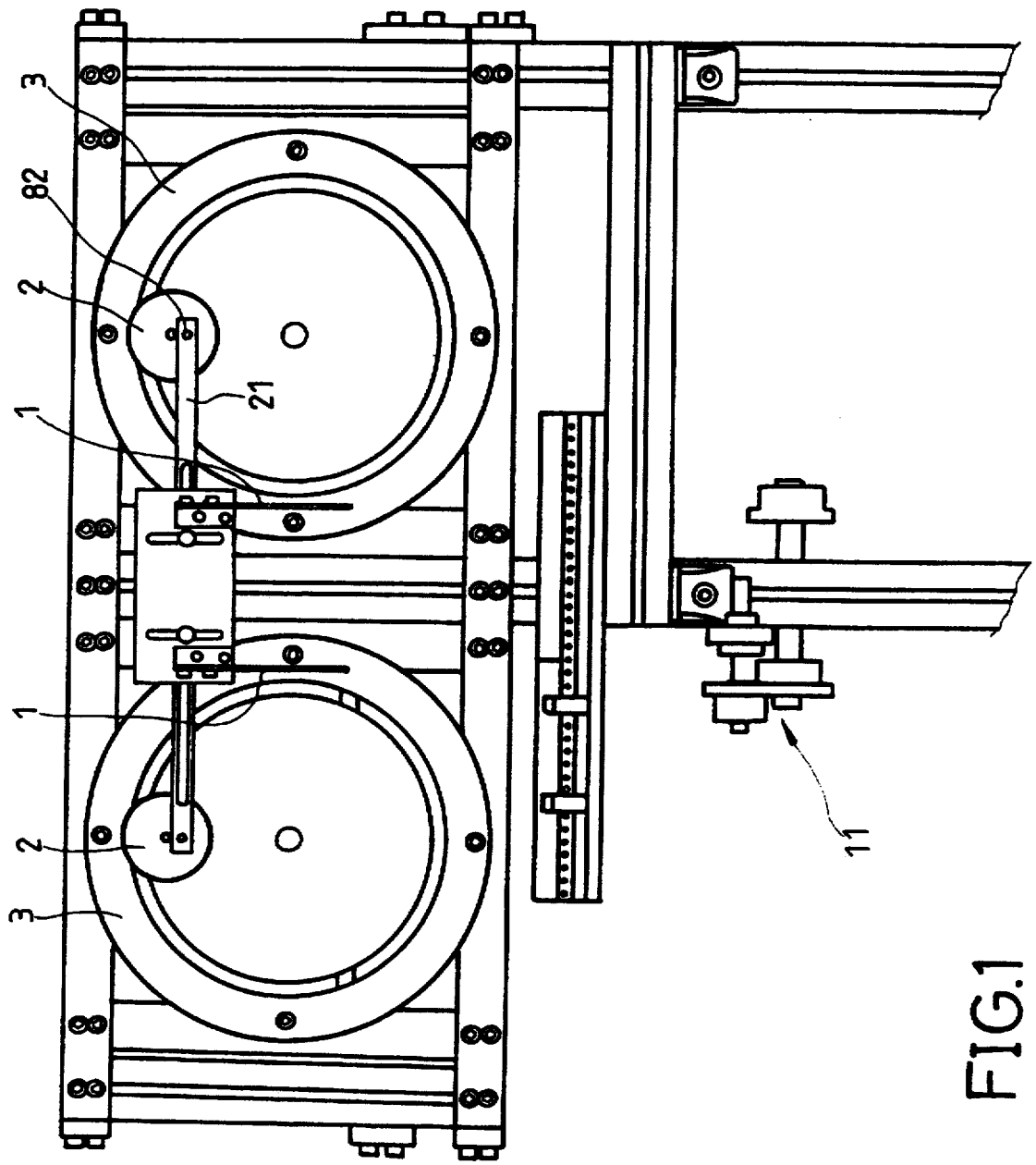
FIG. 1 is a front view of the present invention.
Figure 2:
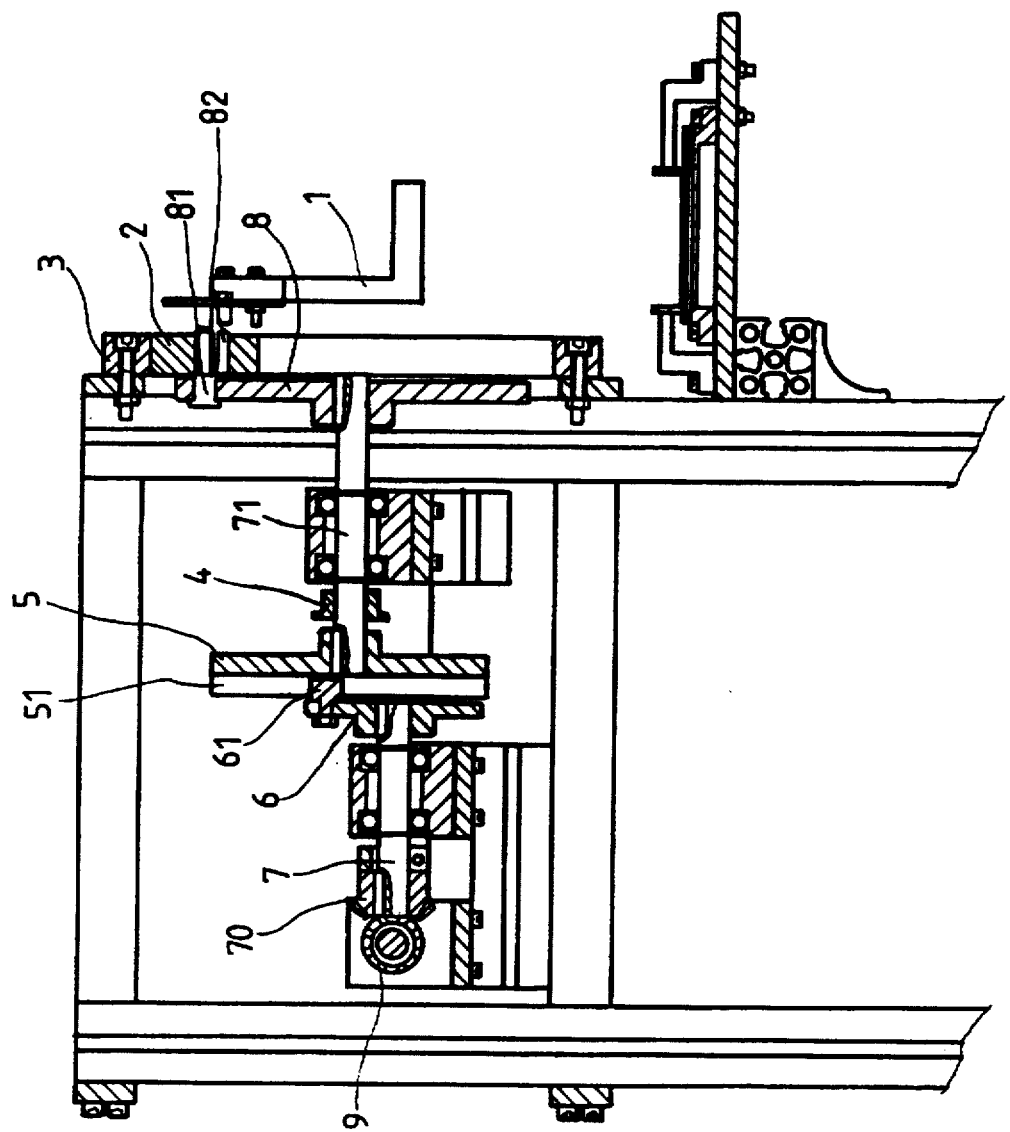
FIG. 2 is a side sectional view of the present invention.
Figure 3:
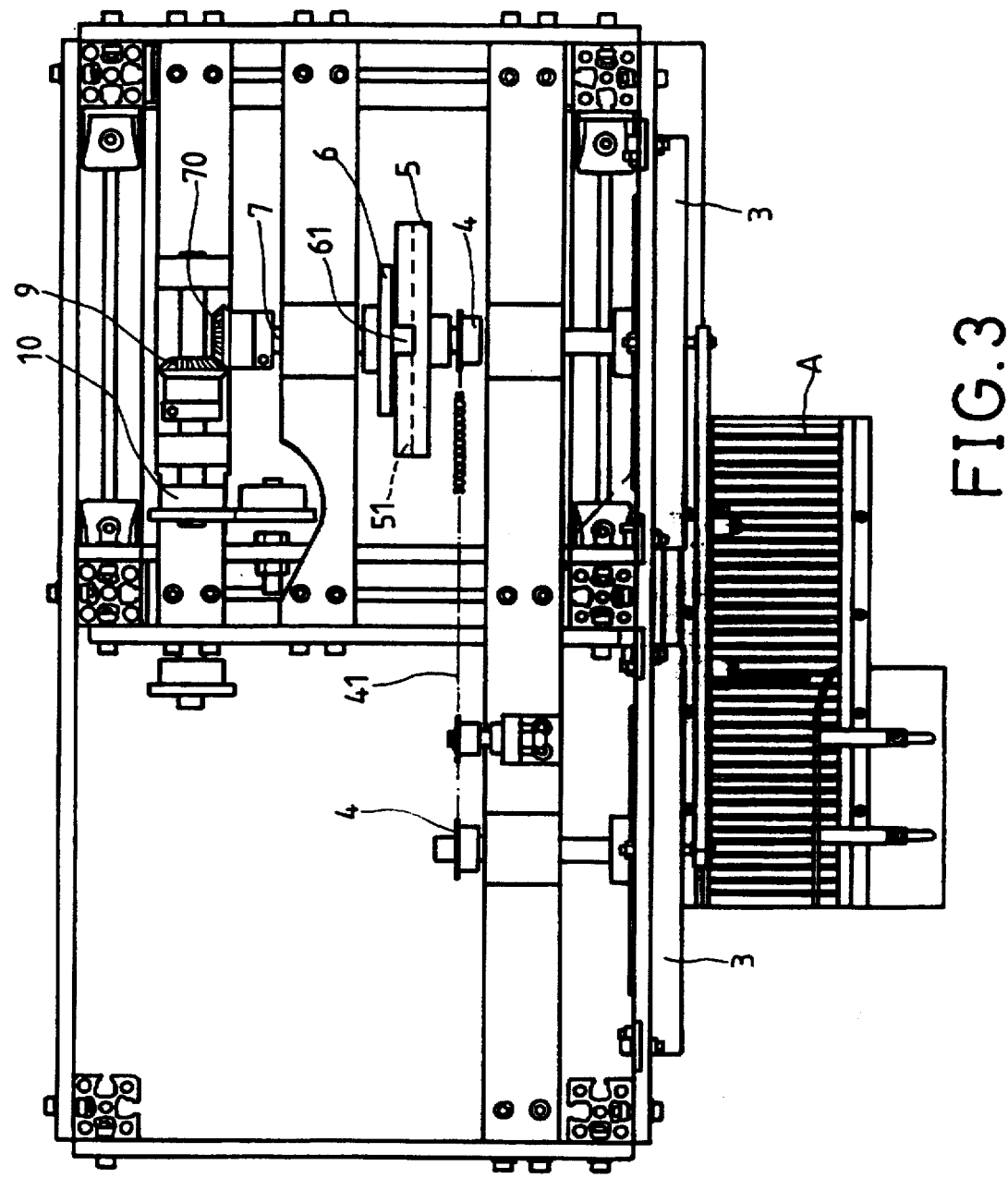
FIG. 3 is a top view of the present invention.

Referring to the drawings and in particular to FIGS. 1 to 3, the brick-like article feeding mechanism of the present invention includes a pushing arm 1, a spur gear 2, an internal gear 3, a sprocket 4, a channeled disk 5, a cam follower disk 6, a first transmission shaft 7, a second transmission shaft 71 and a fixing pin 81. One end of the first transmission shaft 7 is engaged with a driven bevel gear 70 which is engaged with a driving bevel gear 9. The driving bevel gear 9 is driven by a sprocket connected with a working mechanism of a machine such as packing machine (not shown) by a certain gear ratio. The other end of the first transmission shaft 7 is disposed with the cam follower disk 6. A cam follower 61 is disposed at a position spaced from the center of the cam follower disk 6 by a distance Rc (which is the distance between the center of the cam follower disk and the cam follower). The central line of the second transmission shaft 71 is parallel to the central line of the first transmission shaft 7 and spaced therefrom by a distance Ra. One end of the second transmission shaft 71 is disposed with the channeled disk 5. A radial channel 51 is formed on one face of the channeled disk 5. The cam follower 61 is cooperatively fitted in the channel 51. When the distance between the center of the cam follower 61 and the center of the first transmission shaft 7 is equal to the distance between the first and second transmission shafts 7, 71 (Rc=Ra), in the case that the first transmission shaft 7 is rotated through 180 degrees, the second transmission shaft 71 will be rotated through 270 degrees. When the first transmission shaft 7 is further rotated through 180 degrees, the second transmission shaft 71 is rotated through 90 degrees. Alternatively, the second transmission shaft 71 can be first rotated through 90 degrees and then through 270 degrees so as to achieve a quick returning effect. The other end of the second transmission shaft 71 is disposed with a rotary disk 8. The spur gear 2 is disposed on the rotary disk 8 at a position spaced from the second transmission shaft 71 by a distance 3 rg, wherein rg is the pitch radius of the spur gear 2. The spur gear 2 is engaged with the internal gear 3. The internal gear 3 is fixedly disposed on a machine frame. The gear ratio of the spur gear 2 to the internal gear 3 is 1:4. A synchronous lever member 21 is pivotally disposed on the spur gear 2 at a position spaced from the center by a distance $$rp=(1-\cos 22.5°)/(1-\cos 67.5°)*3\ rg$$

wherein rp is the distance between the center of the spur gear 2 and the center of the fixing pin 82. The pushing arm 1 is secured on the synchronous lever member 21. Another set of second transmission shaft, internal gear, spur gear and pushing arm is disposed adjacent to the above second transmission shaft 71, internal gear 3, spur gear 2 and pushing arm 1. Two sprockets 4 are respectively disposed at middle sections of the two second transmission shafts 71 and a chain 41 is connected between the two sprockets 4 as a linking means. The other end of the synchronous lever member 21 is disposed on the other spur gear 2 at a position spaced from the center by a distance $$rp=(1-\cos 22.5°)/(1-\cos 67.5°)*3\ rg$$

It can be known from FIGS. 1 to 3 that the sprocket 11 via the sprocket 10, driving bevel gear 9 and the driven bevel gear 70 drives the first transmission shaft 7. Therefore, the synchronization between the article feeding mechanism and the working apparatus is defined. The first transmission shaft 7 further drives the cam follower disk 5 to rotate. An eccentricity Ra exists between the first and second transmission shaft 7, 71 so that when the cam follower disk 6 rotates, the cam follower 61 thereon simultaneously slides within the slide channel 51 of the channeled disk 5, whereby when the cam follower disk 6 is rotated through 180 degrees, the channeled disk 5 is rotated through 90 degrees. This is a loading travel. When the cam follower disk 6 is further rotated through 180 degrees, the channeled disk 5 is rotated through 270 degrees. This is an unloading travel. By means of the eccentric apparatus composed of the first and second transmission shafts 7, 71, the spur gear 2 driven thereby creates a quick returning function. The second transmission shaft 71 drives a sprocket 4 to rotate and simultaneously drives another adjacent sprocket 4, making another spur gear 2 synchronously rotate. In addition, the fixing pin 81 of the rotary disk 8 is also pivotally disposed at the center of the spur gear 2, whereby when the second transmission shaft 71 is rotated by one circle, the spur gear 2 can self-rotate by four circles and revolve around the second transmission shaft 71 by one circle. Accordingly, due to the self-rotation and revolution of the spur gear 2, the travel path of the pushing arm 1 secured on the fixing pin 82 spaced from the center of the spur gear by the distance rp is nearly a square. The square travel path of FIG. 4 includes four travels A, B, C and D, wherein travel A costs a period of time equal to the total time cost by travels B+C+D. Therefore, through the travel A, an article Z is transferred from the preceding manufacturing procedure X to the succeeding manufacturing procedure Y as shown in FIG. 4.

Figure 4:
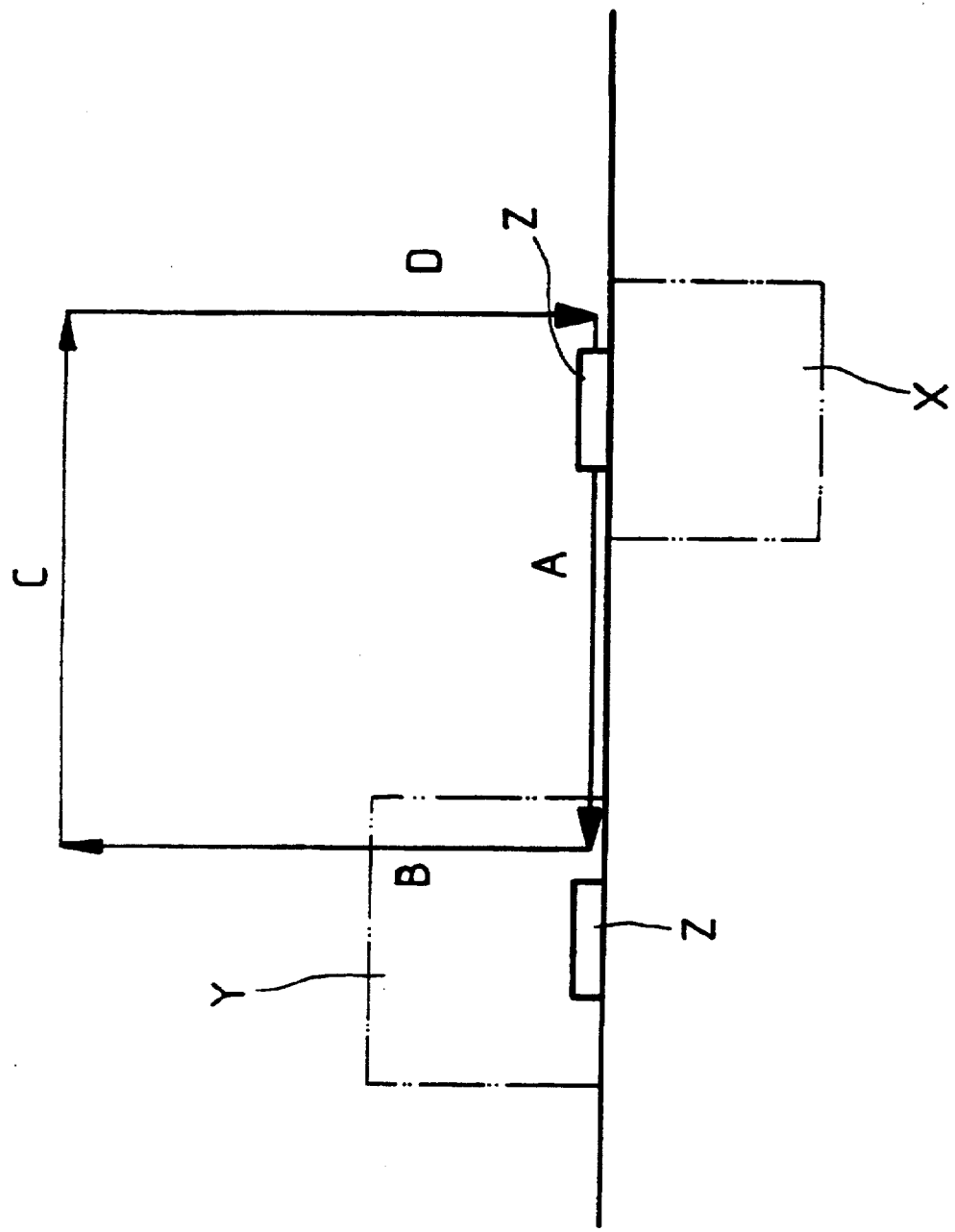
FIG. 4 is a schematic diagram showing that the articles are fed in by the present invention through a nearly square travel path.

Referring to FIGS. 4 and 5-1 to 5-4, by means of the article feeding mechanism of the present invention, the articles Z fed in from the conveyor at front end of the article feeding mechanism are stacked on a roller A. Then the pushing arm 1 is vertically lowered to right side of the articles Z. Then, after the pushing arm 1 horizontally moves to push the articles Z to a fixed position, the pushing arm 1 is vertically lifted to an uppermost position. Thereafter, the pushing arm 1 reversely horizontally moves. By means of the repeated operation, the articles Z are fed into the carrier mounted on the working apparatus. By way of such eccentric mechanism, the loading travel time is increased, while the unloading travel time is shortened. This makes the time cost by the loading travel equivalent to the time cost by the unloading travel so as to perform a quick returning function. The increment of the loading travel time serves to enhance the stability in article feeding operation, while the decrement of the unloading travel time serves to speed up the article feeding operation. Moreover, the nearly square travel path is a continuous transmission, whereby the speed of article feeding is quickened and higher and longer articles can be transferred. The mechanism of the present invention can be not only applied to a packing machine, but also is widely applicable to any other fields requiring nearly square travel path and quick returning function.

It is to be understood that the above description and drawings are only used for illustrating one embodiment of the present invention, not intended to limit the scope thereof. Any variation and derivation from the above description and drawings should be included in the scope of the present invention.

What is claimed is:

1. A brick-like article feeding mechanism with nearly square travel path and quick returning function, comprising a first and a second transmission shafts which are parallel to each other with longitudinally offset axes, one end of the second transmission shaft being disposed with a channeled disk, a radial channel being formed on one face of the channeled disk, one end of the first transmission shaft being disposed with a cam follower disk, a cam follower being disposed on the cam follower disk and spaced from the first transmission shaft a distance equal to a distance between the first and second transmission shafts, the cam follower being cooperatively slidably fitted in the radial channel of the channeled disk, the other end of the second transmission shaft being disposed with a rotary disk, a spur gear being pivotally eccentrically disposed on the rotary disk and an internal gear being fixedly disposed on a machine frame, the gear ratio of the spur gear to the internal gear being 1:4, a fixing pin being disposed on the spur gear and spaced from the center thereof by a certain distance, whereby when the first transmission shaft drives the second transmission shaft, the cam follower is reciprocally slidable within the radial channel so that when the cam follower disk is rotated through 180 degrees, the channeled disk is rotated through 90 degrees (loading travel) and when the cam follower disk is further rotated through 180 degrees, the channeled disk is rotated through 270 degrees (unloading travel), the unloading travel time being equal to the unloading travel time to perform a quick returning function, another set of second transmission shaft, internal gear and spur gear being additionally disposed, two sprockets being respectively disposed at middle sections of the two second transmission shafts and a chain being connected between the two sprockets as a linking means, whereby the two spur gears can synchronously self-rotate and revolve in the two internal gears so that when the second transmission shaft is rotated by one circle, the spur gear can self-rotate by four circles and revolve around the second transmission shaft by one circle, making two pushing arms pivotally disposed on the spur gears have nearly square travel path.

2. The brick-like article feeding mechanism as claimed in claim 1, wherein the pushing arms are disposed at a predetermined position on the spur gears and the first and second transmission shafts and the cam follower form a quick returning mechanism making the loading travel time equal to the unloading travel time for quick returning in article feeding operation.

* * * * *